United States Patent
Okubo et al.

(10) Patent No.: US 9,545,839 B2
(45) Date of Patent: Jan. 17, 2017

(54) HYBRID ELECTRIC VEHICLE POWERTRAIN WITH ENHANCED REVERSE DRIVE PERFORMANCE

(75) Inventors: Shunsuke Okubo, Belleville, MI (US); Ming Lang Kuang, Canton, MI (US); Fazal Urrahman Syed, Canton, MI (US); Carol Louise Okubo, Belleville, MI (US); Shailesh Shrikant Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2111 days.

(21) Appl. No.: 12/204,825

(22) Filed: Sep. 5, 2008

(65) Prior Publication Data

US 2010/0063704 A1 Mar. 11, 2010

(51) Int. Cl.
| | |
|---|---|
| *G06F 19/00* | (2011.01) |
| *B60K 6/365* | (2007.10) |
| *B60K 6/445* | (2007.10) |
| *B60W 10/06* | (2006.01) |
| *B60W 10/08* | (2006.01) |
| *B60W 20/00* | (2016.01) |
| *B60K 1/02* | (2006.01) |

(52) U.S. Cl.
CPC .............. *B60K 6/365* (2013.01); *B60K 6/445* (2013.01); *B60W 10/06* (2013.01); *B60W 10/08* (2013.01); *B60W 20/00* (2013.01); *B60K 1/02* (2013.01); *B60L 2240/486* (2013.01); *B60W 2510/244* (2013.01); *B60W 2710/0644* (2013.01); *B60W 2710/0666* (2013.01); *B60W 2710/105* (2013.01); *Y02T 10/6239* (2013.01); *Y02T 10/6286* (2013.01)

(58) Field of Classification Search
CPC ........ G06F 19/00; B60W 10/06; B60W 20/00; F02D 41/22; B60K 2741/065; F02P 17/08
USPC ... 701/99, 103; 180/65.225, 653.25, 65.235; 290/40 C
See application file for complete search history.

(56) References Cited

U.S. PATENT DOCUMENTS

| | | | |
|---|---|---|---|
| 4,107,776 A * | 8/1978 | Beale ................... | B60W 10/06 477/43 |
| 5,176,213 A | 1/1993 | Kawai et al. | |
| 5,343,970 A * | 9/1994 | Severinsky ............ | B60K 6/387 180/165 |
| 5,730,676 A | 3/1998 | Schmidt | |
| 5,775,449 A | 7/1998 | Moroto et al. | |
| 5,788,006 A | 8/1998 | Yamaguchi | |
| 5,839,533 A | 11/1998 | Mikami et al. | |
| 5,846,155 A | 12/1998 | Taniguchi et al. | |

(Continued)

FOREIGN PATENT DOCUMENTS

| | | |
|---|---|---|
| BE | 1011629 | 11/1999 |
| EP | 1260397 | 11/2002 |

(Continued)

*Primary Examiner* — Shardul Patel
(74) *Attorney, Agent, or Firm* — David B. Kelley; Brooks Kushman P.C.

(57) ABSTRACT

A method for controlling a hybrid electrical vehicle powertrain having an engine that is a source of power during forward drive and an electric motor that is a source of reverse driving power. A desired engine power during reverse drive is achieved by operating the engine at an increased speed that is greater than an optimum speed for a given engine power.

14 Claims, 4 Drawing Sheets

(56) References Cited

U.S. PATENT DOCUMENTS

| | | | |
|---|---|---|---|
| 5,847,469 A * | 12/1998 | Tabata | B60K 6/365 |
| | | | 290/40 C |
| 5,887,670 A | 3/1999 | Tabata et al. | |
| 5,899,286 A | 5/1999 | Yamaguchi | |
| 5,934,396 A | 8/1999 | Kurita | |
| 5,935,035 A | 8/1999 | Schmidt | |
| 5,935,040 A | 8/1999 | Tabata et al. | |
| 5,951,614 A | 9/1999 | Tabata et al. | |
| 6,048,289 A * | 4/2000 | Hattori | B60K 6/48 |
| | | | 180/65.25 |
| 6,081,042 A | 6/2000 | Tabata et al. | |
| 6,249,723 B1 | 6/2001 | Lutz | |
| 6,267,062 B1 | 7/2001 | Hamilton, Jr. | |
| 6,302,227 B1 | 10/2001 | Takemura et al. | |
| 6,317,665 B1 | 11/2001 | Tabata et al. | |
| 6,336,063 B1 | 1/2002 | Lennevi | |
| 6,370,451 B2 | 4/2002 | Lutz | |
| 6,387,007 B1 | 5/2002 | Fini, Jr. | |
| 6,394,208 B1 | 5/2002 | Hampo et al. | |
| RE37,743 E | 6/2002 | Yang | |
| 6,407,521 B1 | 6/2002 | Raftari et al. | |
| 6,409,623 B1 | 6/2002 | Hoshiya et al. | |
| 6,427,794 B1 | 8/2002 | Raftari et al. | |
| 6,441,574 B1 | 8/2002 | Phillips et al. | |
| 6,453,222 B1 | 9/2002 | Lasson et al. | |
| 6,478,705 B1 | 11/2002 | Holmes et al. | |
| 6,490,511 B1 | 12/2002 | Raftari et al. | |
| 6,520,879 B2 | 2/2003 | Kawabata et al. | |
| 6,603,215 B2 * | 8/2003 | Kuang | B60L 11/123 |
| | | | 290/40 C |
| 6,664,751 B1 | 12/2003 | Gabriel et al. | |
| 6,691,809 B2 | 2/2004 | Hata et al. | |
| 6,991,053 B2 * | 1/2006 | Kuang | B60K 6/445 |
| | | | 180/65.235 |
| 6,991,584 B2 * | 1/2006 | Cowan | F16H 61/061 |
| | | | 477/110 |
| 7,000,717 B2 * | 2/2006 | Ai | B60K 6/445 |
| | | | 180/65.235 |
| 7,285,869 B2 * | 10/2007 | Syed | B60K 6/44 |
| | | | 180/65.28 |
| 7,497,285 B1 * | 3/2009 | Radev | B60K 6/26 |
| | | | 180/65.225 |
| 7,576,501 B2 * | 8/2009 | Okubo | B60K 6/365 |
| | | | 180/65.1 |
| 2002/0023790 A1 | 2/2002 | Hata et al. | |
| 2002/0065162 A1 | 5/2002 | Kaneko et al. | |
| 2006/0022469 A1 | 2/2006 | Syed et al. | |
| 2007/0243970 A1 * | 10/2007 | Amano | B60K 6/365 |
| | | | 477/3 |
| 2008/0183366 A1 * | 7/2008 | Bauerle | F02M 35/09 |
| | | | 701/103 |
| 2010/0138086 A1 * | 6/2010 | Imamura | B60K 6/445 |
| | | | 701/22 |

FOREIGN PATENT DOCUMENTS

| | | |
|---|---|---|
| EP | 1279544 | 1/2003 |
| GB | 2406318 | 3/2005 |
| JP | 2000-045813 | 2/2000 |
| JP | 2004-56922 | 2/2004 |
| JP | 2004-056922 | 2/2004 |
| WO | 03/035421 | 5/2003 |

* cited by examiner

HYBRID ELECTRIC VEHICLE POWERTRAIN WITH ENHANCED REVERSE DRIVE PERFORMANCE

BACKGROUND OF THE INVENTION

1. Field of the Invention

The invention relates to hybrid electric vehicle powertrains in which an electric motor is a source of reverse drive torque.

2. Background Art

A hybrid electric vehicle powertrain with split power flow paths includes an electric power source and a mechanical power source, such as an internal combustion engine. A high voltage traction motor, a battery and an electrical generator are electrically coupled. The engine and the traction motor are drivably connected to vehicle traction wheels through power transmission gearing.

A powertrain having a configuration with split power flow characteristics is disclosed in U.S. Pat. Nos. 6,991,053 and 7,285,869, which are assigned to the assignee of the present invention. That configuration includes a planetary gear system that establishes a divided torque delivery path from the electrical and mechanical power sources to the vehicle traction wheels. The planetary gear system includes a ring gear drivably connected to the traction wheels through transmission gearing, a sun gear drivably connected to the generator and a carrier drivably connected to the engine. The generator, the motor and the battery are electrically coupled.

Positive engine torque applied to the carrier during forward drive of the vehicle in a split power delivery mode is in a direction that enhances the drive torque from the motor at the vehicle traction wheels as shown in equation (1) below. Conversely, during reverse drive, the drive torque from the motor at the vehicle traction wheels is in the direction opposite to the torque in forward drive. Engine torque thus reduces the net driving torque at the vehicle traction wheels. A particular example of this is shown in equation (2) below when Tmotor equals −200 Nm. It is seen from equation (2) that any positive engine torque will reduce the absolute value of wheel torque during reverse drive.

Engine torque output during reverse operation is minimized to maximize reverse drive performance. If possible, all reverse drive torque is obtained from electric power provided to the motor by the battery. However, if the battery cannot provide sufficient electric power to meet the driver's request for reverse torque, then the engine must be used to drive the generator to generate electric power to charge the battery.

Positive driving torque developed by the engine reduces the net available wheel torque in reverse as demonstrated by the following steady-state equation:

$$T_{Wheel} = K_1(T_{motor} + K_2 T_{engine}), \quad (1)$$

where:

$K_1$ and $K_2$ are positive mechanical gear ratios, and $T_{motor}$=motor torque, which is positive in the forward direction and negative in the reverse direction, and $T_{engine}$=engine torque.

During reverse drive, for example, $T_{motor}$ might equal −200 Nm. Wheel torque $T_{wheel}$ then would equal:

$$T_{Wheel} = K_1(-200 \text{ Nm} + K_2 T_{engine}) \quad (2)$$

Because of cold operating temperatures, or high operating temperatures, or age, or battery state-of-charge limits, the high voltage battery may not be capable of meeting a driver's request for reverse torque at the traction wheels. The engine, therefore, must be used to generate electric power for use by the electric motor to power the traction wheels. In this situation, equations (1) and (2) demonstrate that the available reverse wheel torque then will be reduced.

SUMMARY OF THE INVENTION

The reduction in wheel torque that occurs when the engine is used to drive the generator to charge the battery during reverse drive can be minimized if the engine power is generated at a high speed and low torque operating point rather than at a speed and torque operating point that normally would be used for high engine operating efficiency. This is achieved by using a calibratable variable map that specifies a desirable engine speed and torque for reverse drive that is different than an engine speed and torque map that would be followed during forward drive.

The map for establishing an operating point during reverse drive will develop a gradual increase in engine speed for a given increase in engine power as engine speed is increased from an engine idle state to a target operating point that would be optimum for reverse drive. The target engine speed at that operating point is a function of desired engine power. The change in engine speed from an idle state to the target engine speed for reverse drive is a gradual change that will not result in a sudden increase in speed as engine speed at idle is increased to the desired engine target speed for reverse drive. This avoids undesirable noise vibration and harshness in the powertrain.

The maximum engine target speed is a function of vehicle speed. Therefore, the calibratable operational map could be a function of two variables. In the alternative, it could be a function of one variable, which is engine power, where the power is clipped to limit the driver's power command to produce a maximum engine speed during reverse drive.

PARTICULAR DESCRIPTION OF AN EMBODIMENT OF THE INVENTION

Figure 1:
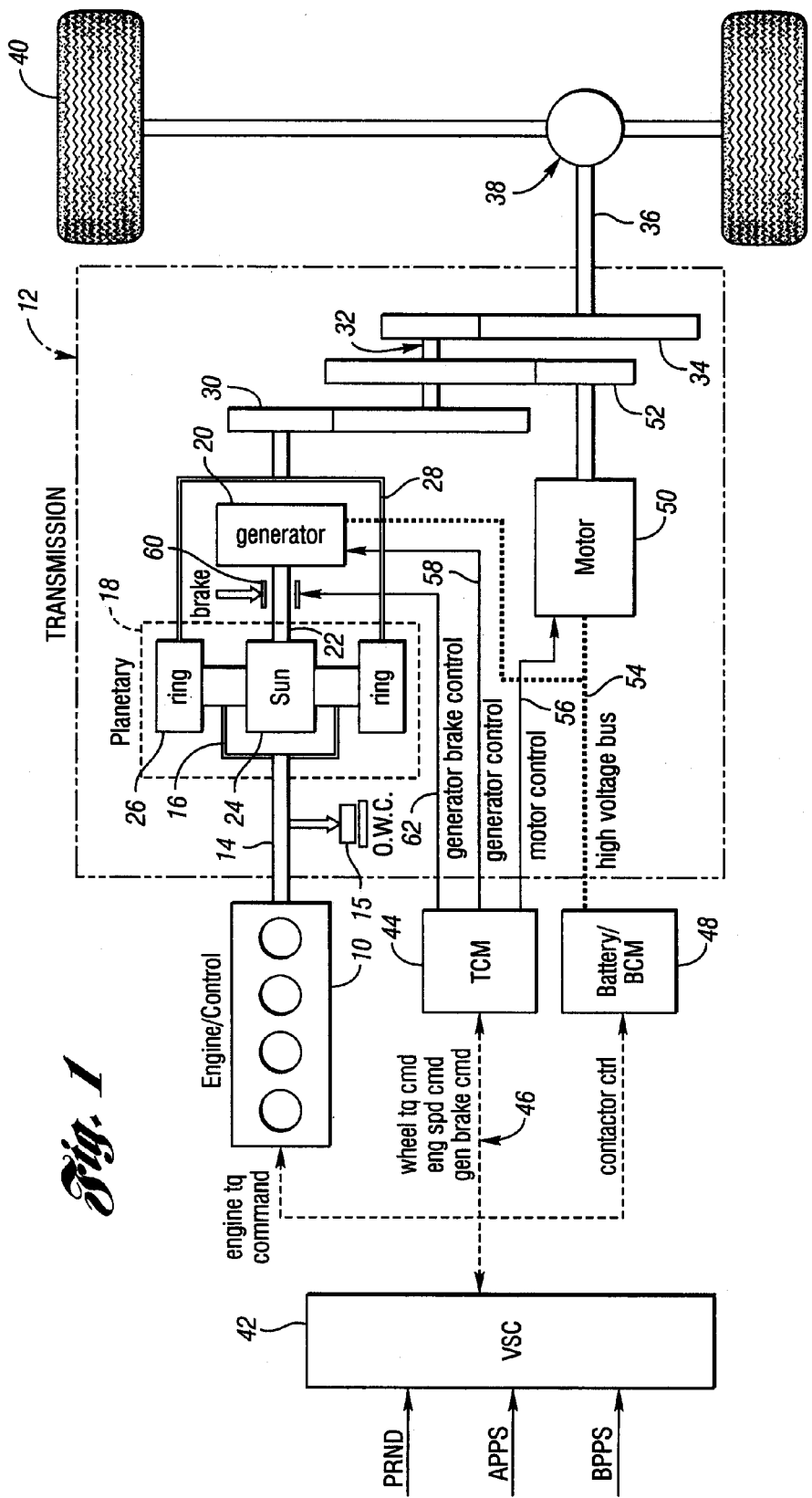
FIG. 1 is a schematic representation of a split power hybrid electric vehicle powertrain capable of embodying the invention.

FIG. 1 is a schematic diagram of a series-parallel hybrid electric vehicle powertrain capable of using the control strategy of the invention.

The configuration of FIG. 1 includes an internal combustion engine 10 and a power transmission 12. The engine crankshaft of the engine 10, which would correspond to the transmission torque input shaft 14, is connected drivably to the carrier 16 of a planetary gear unit 18. An electric generator 20, which may act as a motor under certain operating conditions, is connected mechanically by shaft 22 to sun gear 24 of planetary gear unit 18. Carrier 16 rotatably supports pinions that engage sun gear 24 and planetary ring gear 26.

A torque transmitting element 28 transfers ring gear torque to torque input element 30 of countershaft gearing 32. An output gear element 34 of the countershaft gearing 32 is connected drivably, as shown at 36, to a differential-and-axle assembly generally indicated at 38, whereby torque is transferred to vehicle traction wheels 40.

A vehicle system controller (VSC) 42 is electrically coupled to a transmission control module (TCM) 44 and to a control unit (ECU) for engine 10. Torque command signals are distributed by the vehicle system controller through signal flow paths, generally indicated at 46, to the engine control unit. Signal flow paths 46 provide signal communication also between the vehicle system controller 42 (VSC) and the transmission control module (TCM) 44. A battery and battery control module (BCM) 48 is electrically coupled through signal flow paths 46 to the vehicle system controller 42. The vehicle system controller (VSC) receives powertrain inputs, such as transmission range selector position (PRND), accelerator pedal position (APPS) and a brake pedal position signal (BPPS), and acts as a supervisor controller for the BCM, the TCM, and the ECU. Collectively, the VSC, the TCM, the BCM and the ECU define an overall powertrain control module (PCM). All of these control system elements are in communication through an in-vehicle network using a controller area network (CAN) protocol.

The generator 20 is electrically coupled to electric motor 50. The rotor of motor 50 is mechanically connected to motor torque driving gear 52 for the countershaft gearing 32. As seen in FIG. 1, the electrical coupling between the generator 20 and the motor is provided by a high voltage bus 54, powered by the battery and battery control module 48.

The transmission (transaxle) control module 44 is in communication with the motor 50 through motor control signal flow path 56. The generator communicates with the transmission control module through signal flow path 58. A generator brake, which is indicated at 60, is electrically connected to the transmission control module through signal flow path 62.

When brake 60 is applied, engine power is transmitted through a fully-mechanical torque flow path from the engine, through the planetary gear unit 18 and through the countershaft gearing 32 to the traction wheel-and-axle assembly.

During normal hybrid electric powertrain operation in forward drive, the brake 60 would be released and the generator 20 would apply reaction torque to the sun gear, thereby establishing parallel torque flow paths from the engine to the differential-and-axle assembly, and from the motor-generator subsystem through the countershaft gear assembly 32 to the wheel-and-axle assembly.

The powertrain system schematically illustrated in FIG. 1 may rely upon a fully electric motor drive or upon both motor power and engine power to achieve maximum efficiency. The system of FIG. 1 may generate electrical power while driving the vehicle using generator power output. The vehicle system controller will maintain the vehicle at its maximum performance point by managing the power distribution among the various components of the vehicle. It manages the operating state of the engine, the generator, the motor, and the battery to maximize total vehicle efficiency. The battery is an energy storage medium for the generator and the motor.

The engine power can be split into two power flow paths by controlling the generator speed to effect a mechanical power flow path from the engine 10 to the carrier of the planetary gear unit 18, to the ring gear of the planetary gear unit and to the countershaft gearing 32. An electrical power flow path is established from the engine 10, to the generator 20, to the motor 50 and to the countershaft gearing 32.

The engine power flow path is divided by controlling the engine speed to a desired value, which results in a definite generator speed for a given ring gear speed. The generator speed will change according to vehicle speed. The changing generator speed will vary the engine output power split between the electrical power flow path and the mechanical power flow path.

The control of engine speed results in a generator torque to react against the engine output torque. This generator reaction torque causes the engine output torque to be distributed to the ring gear of the planetary gear set and eventually to the wheels. This mode of operation is called "positive split."

Because of the kinematic properties of the planetary gear set, the generator can rotate in the same direction as the direction of the torque that reacts against the engine output torque. In this operating mode the generator inputs power to the planetary gear set to drive the vehicle. This operating mode is called "negative split." As in the case of the "positive split" mode, the generator torque that results from the generator speed control reacts against the engine output torque and distributes engine output torque to the vehicle traction wheels.

In a generator drive mode, with the engine off, the generator acts as a motor, the motor drive reaction torque being developed by overrunning brake 15 (one-way coupling OWC), which anchors carrier 16. This combination of the motor, the generator, and the planetary gear set acts as an electromechanical continuously variable transmission.

When the generator brake is actuated to effect parallel mode operation, the sun gear is locked from rotating and generator braking torque provides reaction torque that opposes engine output torque. In this mode of operation, all the engine output torque is transmitted, with a fixed gear ratio, to the vehicle traction wheels through a mechanical torque flow path.

This power split powertrain, unlike a conventional vehicle powertrain, requires either generator torque resulting from engine speed control or generator brake torque to transmit engine output power through both an electrical and a mechanical power flow path or solely through the mechanical parallel path to effect forward motion of the vehicle.

The second power source causes electric motor power to be drawn from the battery to provide propulsion independently of the engine to drive the vehicle in either a forward direction or a reverse direction. This mode of operation is called "electric drive." In addition, the generator can draw power from the battery and drive against a one-way clutch on the engine output shaft to propel the vehicle in a forward direction. This mode of operation is called "generator drive."

The high voltage traction battery acts as an energy storing device that stores electrical power that has been converted into electricity by the generator. It also stores kinetic energy developed by the vehicle during coast braking. The coast braking energy is delivered to the storage battery by the traction motor.

Figure 2:
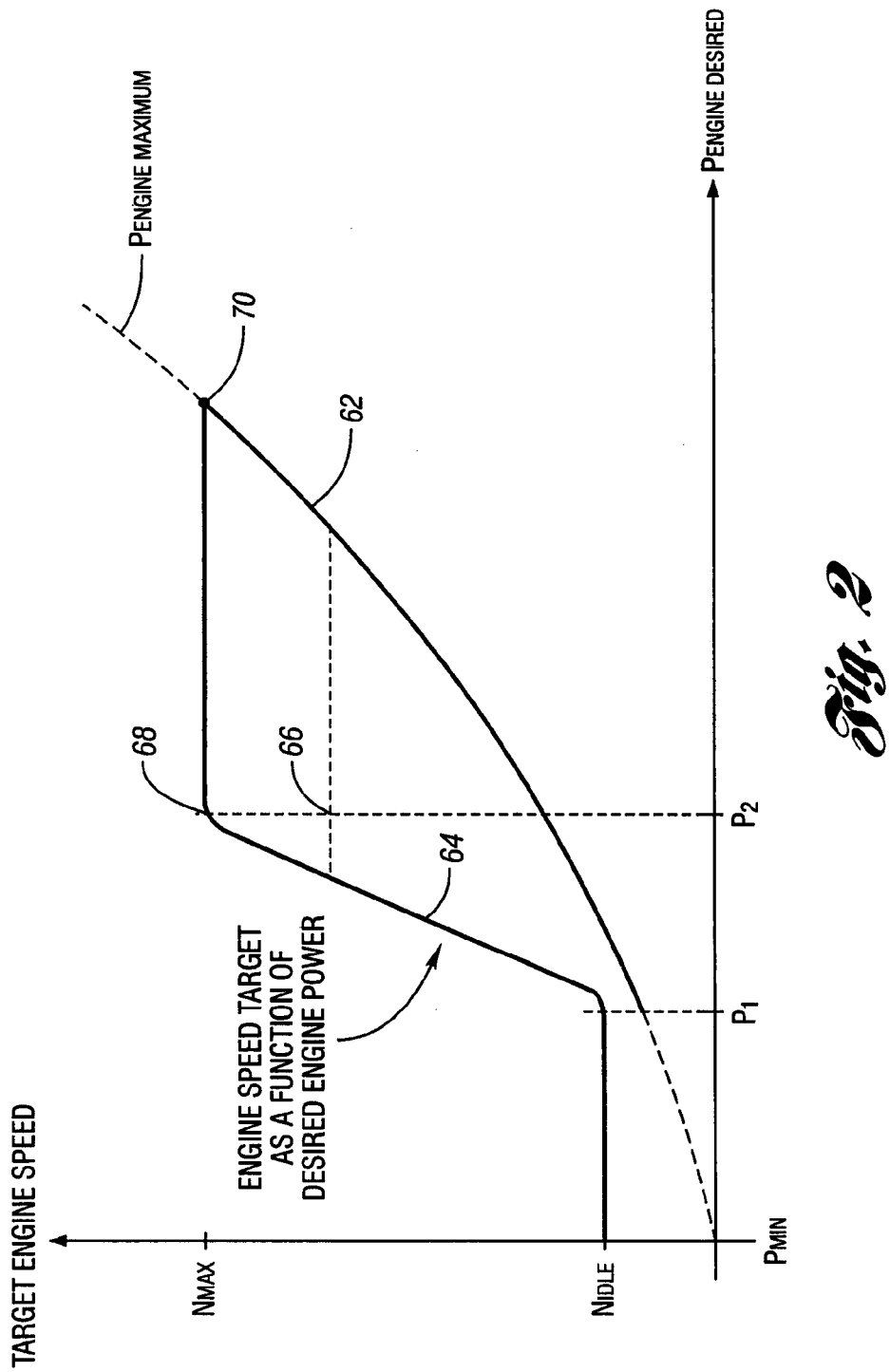
FIG. 2 is a plot or map that specifies engine variables for operation in reverse.

FIG. 2 shows a map or a plot of the relationship between desired engine power and target engine speed for reverse drive. A relationship between desired engine power and target engine speed that will effect maximum engine power is shown at 62. The relationship shown at 62 is typically non-linear for an internal combustion engine.

The maximum engine power at idle is designated in FIG. 2 as P1. At this idle power, engine speed is designated as $N_{idle}$. The maximum engine speed that corresponds to maximum engine power is indicated as $N_{max}$. The maximum target engine power corresponding to maximum target engine speed is indicated as $P_2$. The vehicle operator may choose a target engine power by adjusting the accelerator pedal position. An accelerator pedal position sensor distributes a signal to the vehicle system controller 42, which processes the signal and issues a target engine speed command to TCM 44 using the plot of FIG. 2, stored in ROM. The plot of FIG. 2 is calibrated to provide a gradual increase in target engine speed when desired engine power is changed from $P_1$ to $P_2$ as shown at 64. This gradual increase will avoid undesirable noise and vibrations as engine speed changes from the idle speed to the target speed.

The plot of FIG. 2 defines the relationship between target engine speed and desired engine power during engine operation. In a reverse drive mode, if the state-of-charge of the battery is reduced below a calibrated threshold, engine power is used to drive the generator 20, which charges the battery 48. Target engine speed shown at 66 is less than maximum target engine speed at 68. The maximum engine power at maximum engine speed 68 is shown at 70.

Figure 4:
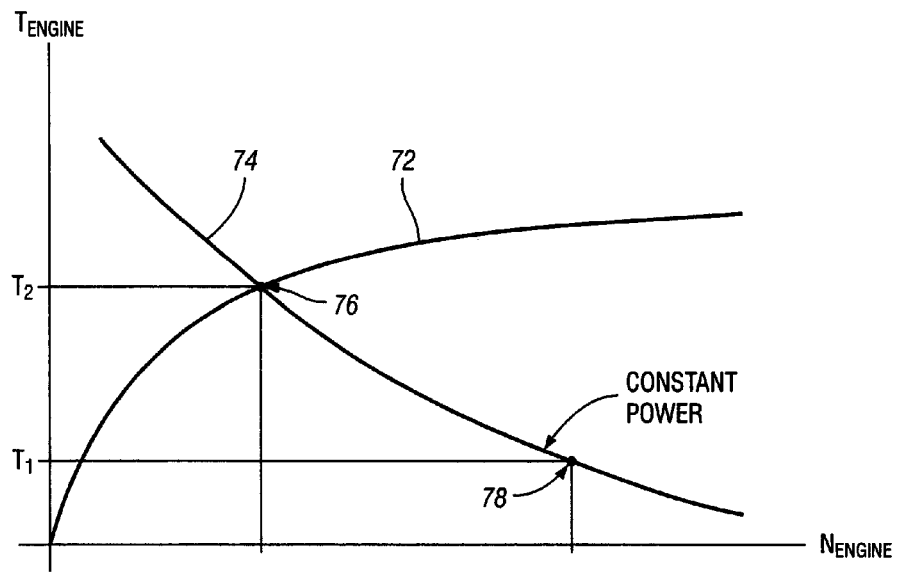
FIG. 4 shows a relationship between engine torque and engine speed to achieve a constant engine power and a plot of engine torque and engine speed for maximum engine operating efficiency.

FIG. 4 shows at 72 a plot of engine speed and engine torque that will effect maximum engine efficiency. A constant power relationship between engine torque and engine speed is shown at 74. During normal forward drive operation, the engine will operate at the point of intersection 76 where maximum efficiency would be achieved. If engine speed were to increase during reverse drive operation to a target speed appropriate for reverse drive, as shown at 78, the engine torque would be reduced to a value indicated at $T_1$, which is substantially lower than the optimum engine torque value at $T_2$.

Figure 5:
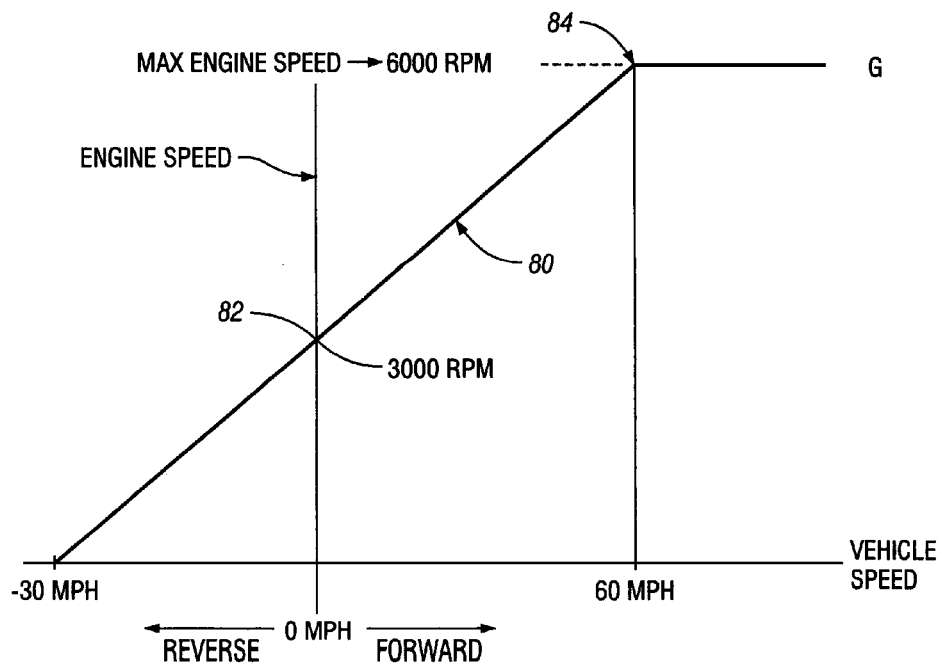
FIG. 5 is a plot of engine speed and vehicle speed for reverse drive and forward drive.

FIG. 5 is a plot of engine speed and vehicle speed, which may be a linear relationship for any given transmission gear ratio as shown at 80. During forward drive operation, the engine speed may vary from about 3000 rpm at point 82 to a maximum engine speed of about 6000 rpm, as shown at 84. During reverse drive, engine speed may vary from the value shown at 82 to a 0 value as vehicle speed in reverse drive varies from 0 to about 30 mph.

Figure 3:
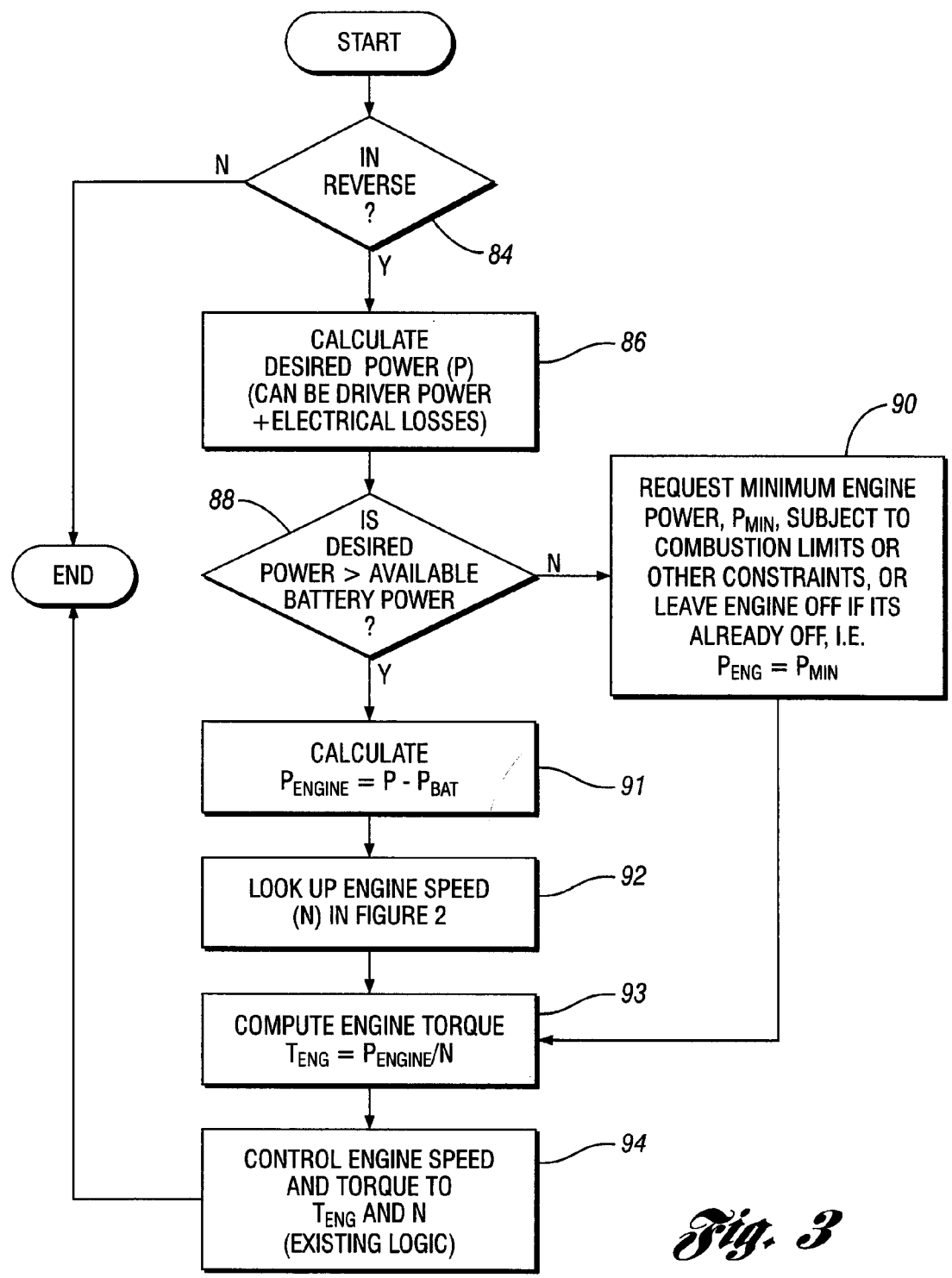
FIG. 3 is a flowchart that illustrates an algorithm for executing the control strategy of the invention.

FIG. 3 is a flowchart that demonstrates the strategy of the reverse drive mode for the hybrid electric vehicle powertrain architecture seen in FIG. 1. If reverse drive is selected by the operator at step 84, a calculation of desired power during reverse drive is made at step 86. The desired power would be equal to the power requested by the driver plus electrical power losses that are determined empirically. A check is made to determine whether the desired power is greater than the vehicle battery power ($P_{bat}$). This is shown at step 88.

If the desired power does not exceed available battery power, minimum engine power is requested, as shown at 90 in FIG. 3. This minimum engine power can be selected at 90 from a look-up table stored in ROM memory in the vehicle system controller 42. The look-up table is constructed empirically to take into account engine combustion limits and other constraints. For example, the engine may operate at $N_{idle}$ in FIG. 2. In the alternative, the engine may be left off if it is already off. When minimum power is requested, engine torque is computed at 93 using the known relationship between torque, engine power and engine speed. Engine speed then can be controlled, as well as engine torque, in conventional fashion as shown at 94.

If the desired engine power in reverse drive determined at step 88 is greater than the available battery power ($P_{bat}$), the routine will proceed to step 91 where desired engine power is calculated by subtracting $P_{bat}$ from desired power P. With the information determined at step 91, engine speed and torque are controlled to the values $T_{eng}$ and N using the control logic of FIG. 2. The point shown at 78 in FIG. 4 thus is obtained. It should be noted that the torque at point 78 is substantially lower than the torque at point 76 where the engine operates at maximum efficiency.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling reverse driving wheel torque in a powertrain for a hybrid electric vehicle; the powertrain having an engine, an electric motor, an electric battery, an electric motor-generator; and split power delivery paths extending from the engine and the motor to vehicle traction wheels; the method comprising:
   requesting a desired reverse driving power at the traction wheels;
   measuring battery state-of-charge;
   comparing requested reverse driving power to available battery power at the measured state-of-charge;
   requesting a minimum engine power when the reverse driving power request is less than the available battery power for the measured battery state-of-charge;
   computing engine torque at the minimum engine power request; and
   controlling engine speed and engine torque to achieve the minimum engine power during reverse drive such that enhanced reverse driving torque at the traction wheels is achieved as the motor drives the traction wheels.

2. A method for controlling reverse driving wheel torque at traction wheels in a powertrain for a hybrid electric vehicle; the powertrain having an engine, an electric motor, an electric battery and an electric motor-generator; the motor, the battery and the motor-generator being electrically coupled; and split power delivery paths extending from the engine and the motor to vehicle traction wheels; the method comprising:
   requesting a desired reverse driving power at the traction wheels;
   calculating engine power by subtracting battery power at a measured state-of-charge when desired power during reverse drive is greater than battery power for a measured battery state-of-charge; and
   controlling engine speed and engine torque to achieve desired engine power during reverse drive when desired driving power is greater than battery power at the measured state-of-charge, wherein the engine torque opposes motor torque at the traction wheels and enhanced reverse driving torque at the traction wheels is achieved as the motor drives the traction wheels and the engine operates at an engine speed and at an engine torque corresponding to an engine efficiency that is less than optimum engine efficiency.

3. A method for controlling reverse driving wheel torque in a powertrain for a hybrid electric vehicle; the powertrain having an engine, an electric motor, an electric battery and an electric motor-generator, and split power gearing defining power delivery paths extending from the engine and the motor to vehicle traction wheels, the method comprising:

requesting a desired reverse driving power at the traction wheels;

requesting a reduced engine power when the reverse driving power request is less than available battery power for a measured battery state-of-charge;

calculating engine power when the reverse driving power request is greater than battery power for the measured state-of-charge by subtracting battery power at the measured battery state-of-charge from desired power;

determining engine torque as a function of target engine speed and the calculated engine power when the reverse driving power request is greater than available battery power for the measured battery state-of-charge;

computing engine torque as a function of the determined engine speed and the calculated engine power when the reverse driving power request is less than available battery power for the measured battery state-of-charge; and controlling engine speed and engine torque as a function of engine power and engine torque, wherein engine torque opposes driving torque at the traction wheels and enhanced reverse driving torque at the traction wheels is achieved.

4. The method set forth in claim 1 wherein the requested power comprises power at the traction wheels demanded by a driver plus electrical losses in the powertrain.

5. The method set forth in claim 2 wherein the requested power comprises power at the traction wheels demanded by a driver plus electrical losses in the powertrain.

6. The method set forth in claim 3 wherein the requested power comprises power demanded by a driver plus electrical losses in the powertrain.

7. A method for providing reverse driving wheel torque in a powertrain for a hybrid electric vehicle, the powertrain having an engine, an electric motor, an electric battery and an electric motor-generator; the motor, the battery and the motor-generator being electrically coupled, the motor being mechanically coupled to vehicle traction wheels; split power gearing having a first gearing element mechanically connected to the engine, a second gear element mechanically connected to the motor-generator and a third element mechanically connected to the vehicle traction wheels; the method comprising:

requesting a desired reverse driving power at the traction wheels;

measuring battery state-of-charge;

comparing requested reverse driving power to available battery power at the measured state-of-charge;

requesting a minimum engine power when the reverse driving power request is less than the available battery power for the measured battery state-of-charge;

computing engine torque at the minimum engine power request; and controlling engine speed and engine torque to achieve the minimum engine power during reverse drive so that enhanced reverse driving torque at the traction wheels is achieved as the motor exclusively drives the traction wheels.

8. A method for controlling reverse driving wheel torque in a powertrain for a hybrid electric vehicle, the powertrain having an engine, an electric motor, an electric battery and an electric motor-generator; the motor, the battery and the motor-generator being electrically coupled, the motor being mechanically coupled to vehicle traction wheels; split power gearing having a first gearing element mechanically connected to the engine, a second gear element mechanically connected to the motor-generator and a third element mechanically connected to the vehicle traction wheels; the method comprising:

requesting a desired reverse driving power at the traction wheels;

measuring battery state-of-charge;

comparing requested reverse driving power to available battery power at the measured state-of-charge;

calculating engine power by subtracting battery power at the measured state-of-charge when desired power is greater than battery power for the measured state-of-charge;

determining an engine speed target as a function of desired engine power to minimize engine torque while providing the desired engine power; and controlling engine speed to achieve desired engine power during reverse drive when desired driving power is greater than battery power at the measured state-of-charge.

9. A method for controlling reverse driving wheel torque in a powertrain for a hybrid electric vehicle, the powertrain having an engine, an electric motor, an electric battery and an electric motor-generator; the motor, the battery and the motor-generator being electrically coupled, the motor being mechanically coupled to vehicle traction wheels; split power gearing having a first gear element mechanically connected to the engine, a second gear element mechanically connected to the motor-generator and a third element mechanically connected to the vehicle traction wheels; the method comprising:

requesting a desired reverse driving power at the traction wheels;

measuring battery state-of-charge;

comparing requested reverse driving power to available battery power at the measured state-of-charge;

requesting a first reduced engine power value when the reverse driving power request is less than available battery power for the measured battery state-of-charge;

calculating a second engine power value when the reverse driving power request is greater than battery power for the measured state-of-charge by subtracting battery power at the measured battery state-of-charge from desired power;

determining engine torque as a function of target engine speed and one of the first and second engine power values;

computing engine torque as a function of the target engine speed and the calculated engine power; and controlling engine speed and engine torque as a function of engine power and engine torque, wherein engine torque reduces driving torque at the traction wheels such that reducing engine torque results in enhanced reverse driving torque at the traction wheels.

10. The method set forth in claim 7 wherein the requested power comprises power at the traction wheels demanded by a driver plus electrical losses in the powertrain.

11. The method set forth in claim 8 wherein the requested power comprises power at the traction wheels demanded by a driver plus electrical losses in the powertrain.

12. The method set forth in claim 9 wherein the requested power comprises power demanded by a driver plus electrical losses in the powertrain.

13. The method set forth in claim 8 wherein target engine speed is a function of desired engine power and wherein the target engine speed, upon an increase in desired engine power, increases at a gradual rate during reverse drive.

14. The method set forth in claim 9 wherein target engine speed is a function of desired engine power and wherein the target engine speed, upon an increase in desired engine power, increases at a gradual rate during reverse drive.

* * * * *